United States Patent Office 3,519,427
Patented July 7, 1970

3,519,427
LIGHT-SENSITIVE SILVER-HALIDE EMULSIONS SUITABLE FOR MAXIMUM-RESOLUTION MATERIALS
Edward A. Sutherns, Harrow, England, assignor to Eastman Kodak Company, Rochester, N.Y., a corporation of New Jersey
No Drawing. Filed Mar. 10, 1967, Ser. No. 622,034
Int. Cl. G03c 1/02
U.S. Cl. 96—94                                  8 Claims

ABSTRACT OF THE DISCLOSURE

An improved process of preparing photosensitive silver-halide grains is disclosed wherein the silver-halide grains are precipitated in the presence of an acid-substituted aryl mercaptan such as thiosalicylic acid, 3-mercapto benzoic acid and the like. Improved photographic elements can be prepared from silver-halide emulsions prepared by this improved process.

---

This invention relates to photographic silver-halide emulsions particularly useful for recording fine detail. Materials prepared from such emulsions are used for the production of reticles, instrument scales, etc.

It is essential that the silver-halide emulsions, used for these purposes, are of very small grain size in order that the resolving power will be as high as possible. To avoid uncontrolled increases of grain size, these emulsions have to be prepared under carefully controlled conditions usually by precipitating the silver-halide from very dilute reagents at the lowest possible temperature. It is also an advantage to use as the percipitating medium a gelatin with strong grain-growth retarding powers or to add artificial retarders. It is difficult to sensitize such emulsions by the classical methods since any heat treatment leads to ripening and an increase of emulsion grain size. Furthermore, the emulsions may also show grain-growth storage.

Emulsions prepared in this way and suitably sensitized are able to resolve very fine detail. They suffer however from one important shortcoming. It is necessary to process such emulsions within a few hours after exposure in order that the effects of the exposure are fully realized. If such emulsions are stored after exposure and developed some time later, e.g. 3 to 4 days after exposure, it is observed that the developed densities for a given exposure are now much lower. For example, if development is deferred until 7 days after exposure in one commercially available material, a transmission density of about 0.75 is obtained instead of a density of 2.0 obtained when the emulsion is developed immediately after exposure. Considerable regression of one of the products of the exposure, viz the latent-image silver, has occurred during storage. It appears that this regression is brought about by recombination of latent-image silver with photolytically-produced halogen which was temporarily trapped in the system and slowly released on storage.

In the present invention, a method of precipitating photographic silver-halide emulsions is described which results in very fine-grained emulsions over a wide range of precipitating conditions and which show latent-image regression to a much lesser extent than currently used high-resolution fine-grain emulsions. In particular, the invention comprises the precipitation of silver-halide emulsions in the presence of an acid-substituted aryl mercaptan, such as a carboxy substituted aryl mercaptan, for example a monocarboxyphenyl mercaptan such as thiosalicylic acid, 3-mercapto benzoic acid and the like. The acid substituted aryl mercaptan is strongly adsorbed to the surfaces of the silver-halide grains. A member of this class will act as a very powerful grain-growth inhibitor and is able to restrain ripening even in the presence of a silver-halide solvent, e.g. potassium thiocyanate. At the same time, the acid-substituted aryl mercaptan acts as a very efficient halogen acceptor.

The addition of the substance after precipitation has taken place (and after the occurrence of unavoidable ripening) does retard further grain growth but has very little if any beneficial effect on the regression which takes place after exposure. In order both to retard grain growth and to reduce post-exposure regression, it is essential that the acid-substituted aryl mercaptan be present during the precipitation. When introduced in this way, it is likely that this substance is strongly adsorbed on all silver-halide surfaces including internal sub-surfaces, e.g., at grain dislocations. Thus, it is possible that some thiosalicylic acid is actually inside the silver-halide grains. It is then able to act as a powerful halogen acceptor and so trap permanently the photolytically-produced halogen which could otherwise react with latent-image silver and cause regression.

The silver-halide emulsions may be precipitated by either the "single-run" method when the thiosalicylic acid is added to the salts in the making kettle or by the "double-jet" technique, when the thiosalicylic acid may be added to the making kettle before adding the soluble silver and halide salts which are added separately but simultaneously, or it may be added with the halide which is run in during the making, or some may be present in the making kettle and some in the halide solution.

In the present invention, the soluble hailde may be all bromide or all chloride or bromide together with a little iodide or bromide together with chloride or bromide together with cholride and iodide.

The temperature of the making kettle does not appear to be critical and satisfactory emulsions have been precipitated at temperatures as high as 85° C. An emulsion precipitated at this temperature in the absence of such a powerful grain-growth inhibitor would have a much larger grain size.

The amount of silver salt to be added in the single-run method and the amounts of halide and silver salts to be added in the double-jet method are determined according to the amount of silver-halide to be formed. The concentrations of the solutions and the times to add them can be varied widely without excessively increasing grain size.

In one embodiment of the invention, the emulsion may be sensitized by heat treatment before coating in order that its sensitivity to light is improved. For example, the emulsion may be chemically sensitized by one of the classical methods. A typical procedure is to hold the emulsion at an elevated temperature together with a labile sulphur, selenium or tellurium compound, e.g. sodium thiosulphate. Such a digestion improves the light sensitivity somewhat. The presence of the grain-growth inhibitor, introduced during the precipitation as described, substantially prevents ripening, and consequent increase in emulsion grain size, from taking place during the subsequet heat treatments.

The presence of the thiosalicylic acid does not prevent dye sensitization and the emulsion may be spectrally sensitized by the addition of suitable dyestuffs to the emulsion before coating.

After exposure, the coated emulsion is processed in a conventional manner, but unlike other high-resolution fine-grain photographic silver-halide emulsions known in the art, no substantial loss of developable density or of photographic speed occurs if the exposed emulsion is stored for a considerable time, e.g. 14 days at 70° F., atmospheric humidity, before processing.

EXAMPLE I

A silver-halide emulsion was prepared by adding a solution containing 39 g. of silver nitrate in 200 ml. distilled water and a solution containing 24.65 g. of potassium bromide, 1.4 g. of sodium chloride and 0.325 g. of potassium iodide in 200 ml. distilled water simultaneously to a solution containing 8 g. of a gelatin, 0.465 g. of potassium chloride, 0.5 g. of thiosalicyclic acid, 5.6 ml. of 1.0 N sulphuric acid and 115 ml. distilled water 72° C. over a period of 20 minutes. Sixty grams of gelatin were added and stirred in over 15 minutes and the emulsion chilled and set. The chilled emulsion was shredded into small noodles and washed 5 hours in running tap water. After washing, the emulsion was remelted, the volume made up to one liter, pH and pAg adjusted to 6.2 and 8.2 respectively, and coated on glass.

Electronmicrographs of the emulsion grains showed that the grain diameter was about 1/10 that of grains in a control emulsion which was made in a similar manner but with no thiosalicylic acid present.

A sample coating of an emulsion prepared according to the invention was compared to a control coating made from an emulsion having a similar grain size but prepared in the absence of thiosalicylic acid. The sensitive materials were sensitometrically exposed for 20 seconds and developed in an Elonhydroquinone developer immediately and after 8 and 16 days' storage in the dark. In the control coating, the developed transmission densities for a given exposure were 2.0, 1.0, and 0.6 when developed immediately and after 8 and 16 days' storage. Regression was much less in the sample coating and the densities for corresponding development conditions were 2.0, 1.96 and 1.93.

EXAMPLE II

An emulsion prepared according to Example I was sulphur sensitized before coating by digesting the washed emulsion for 40 minutes at 55° C. with 0.25 g. sodium thiosulphate per mole of silver halide. Electronmicrographs showed that no alteration of grain size or shape had taken place and the emulsion showed similar sensitometric properties to that described in Example I except that it was about 1½ times more sensitive.

EXAMPLE III

A silver-iodobromide emulsion was prepared by running a solution containing 200 g. of silver nitrate in 2000 ml. distilled water into a solution containing 160 g. of potassium bromide, 9 g. of potassium iodide, 0.25 g. of thiosalicyclic acid and 20 g. of gelatin in 1700 ml. distilled water over 25 minutes at 60° C. After washing and coating on glass, the samples were compared to a control coating made from an emulsion having a similar grain size but prepared in the absence of thiosalicylic acid. The developed transmission density of the control coating fell from 2.0 to 0.75 when development was deferred until 7 days after exposure. The experimental sample showed less fading and under similar conditions a transmission density of 2.0 only fell to 1.73.

EXAMPLE IV

A silver-bromide emulsion was prepared by running a solution containing 200 g. of silver nitrate in 2000 ml. distilled water into a solution containing 165 g. of potassium bromide, 0.25 g. of thiosalicylic acid and 20 g. of gelatin in 1700 ml. distilled water over 50 minutes at 40° C.

After washing and coating on glass, the samples were compared with a control coating made from an emulsion having a similar grain size but prepared in the absence of thiosalicylic acid. The developed transmission density of the control coating fell from 2.0 to 0.75 when development was referred until 7 days after exposure. The experimental sample showed less fading and under similar conditions a transmission density of 2.0 only fell to 1.82.

In the above examples we have demonstrated use of various concentrations of thiosalicylic acid in the silver-halide emulsions. We have found that the minimum effective concentration of thiosalicylic acid effective as a grain-growth restrainer for the purpose of this invention is about 150 mg. per mole silver halide. One hundred mg. per mole concentration thiosalicylic acid is ineffective for the purpose of this invention. At 200 mg. per mole, it has a significant effect on grain size and image retention and at about 2,000 mg. per mole, the optimum effect is obtained. The advantageous effects of thiosalicylic acid in making of fine grain photographic emulsions is obtained in accordance with the present invention only when the acid substituted aryl mercaptan is present during precipitation of the silver halide. Thus the advantages of extremely fine grain and latent image retention will not be obtained when the mercaptan is added as an emulsion addenda in amounts less than 150 mg. per mole silver, for example when added as an antifoggant in lesser amounts, or when added after crystal formation as disclosed in prior art patents relating to antifogging effects of thiosalicylic acid.

Emulsions made by the procedures described above in accordance with the present invention can be sensitized with salts of noble metals of Group VIII of the Periodic Table which have an atomic weight greater than 100, such as gold. Such emulsions can also be reduction sensitized and can be spectrally sensitized using cyanines, merocyanines, complex (trinuclear) cyanines, complex (trinuclear) merocyanines, styryls, and hemicyanines.

Emulsions made in accordance with the invention also may contain speed increasing addenda such as quaternary ammonium salts, polyethylene glycols, thioether sensitizers or combinations thereof. In some embodiments, antifoggants may advantageously be used in emulsions of the type described. For example as antifoggants we may use azaindenes, thiazoles, thiazolium salts, nitron, nitroindazoles, mercury salts, mercaptotetrazoles, and the like. Emulsions made in accordance with the invention may comprise hydrophilic water-permeable salts such as gelatin, polyvinyl compounds, cellulose derivatives, acrylamide polymers, and the like. Binders for the emulsion layer may comprise dispersed polymerized compounds such as water-insoluble polymers of alkylacrylates and methacrylates, acrylic acid, sulfoalkyl acrylates or methacrylates, and the like.

It will be understood that modifications and variations may be made within the scope of the invention as described above and as defined in the appended claims.

I claim:
1. In a process of precipitating photosensitive silver-halide crystals in an aqueous medium, the improvement comprising precipitating said silver-halide crystals in the presence of at least about 150 mg./mole of silver halide precipitated of a carboxy-substituted phenyl mercaptan.

2. A process according to claim 1 wherein said carboxy-substituted phenyl mercaptan is a thiosalicylic acid or 3-mercapto benzoic acid.

3. A process according to claim 1 wherein said silver-halide crystals are formed in the presence of about 2000 mg. of said carboxy-substituted phenyl mercaptan per mole of silver halide formed.

4. A photographic element comprising a support and at least one layer comprising an emulsion prepared according to claim 1.

5. A method of restraining grain growth of silver-halide crystals in the preparation of a photographic silver-halide emulsion, said method comprising the step of precipitating silver-halide from silver ions and halide ions in an aqueous solution in the presence of at least 150 mg./mole of silver halide formed of a mercapto-substituted benzoic acid.

6. A method according to claim 5 wherein said mercapto-substituted benzoic acid is a thiosalicylic acid.

7. A product formed by the process of claim 6.

8. A method of making an extremely fine-grain photographic silver-halide emulsion comprising the step of precipitating silver-halide crystals in an aqueous medium containing at least 150 mg. per mole of silver-halide of a thiosalicylic acid.

References Cited

UNITED STATES PATENTS

| 3,226,231 | 12/1965 | Dersch et al. | 96—108 |
| 3,260,605 | 7/1966 | Sutherns | 96—94 |

J. TRAVIS BROWN, Primary Examiner

U.S. Cl. X.R.

96—61, 107, 109